US011072103B2

(12) United States Patent
Shaw

(10) Patent No.: US 11,072,103 B2
(45) Date of Patent: Jul. 27, 2021

(54) EXTRUSION SYSTEM AND METHOD FOR BLOWN FILM WITH INTEGRAL PROFILES

(71) Applicant: Inteplast Group Corporation, Livingston, NJ (US)

(72) Inventor: Todd Shaw, Richmond, RI (US)

(73) Assignee: Inteplast Group Corporation, Livingston, NJ (US)

( * ) Notice: Subject to any disclaimer, the term of this patent is extended or adjusted under 35 U.S.C. 154(b) by 198 days.

(21) Appl. No.: 15/632,860

(22) Filed: Jun. 26, 2017

(65) Prior Publication Data

US 2018/0370109 A1 Dec. 27, 2018

(51) Int. Cl.
*B29C 48/00* (2019.01)
*B29C 48/92* (2019.01)
*B29C 48/12* (2019.01)
*B29C 48/88* (2019.01)
B29L 31/00 (2006.01)
B29C 48/08 (2019.01)
(Continued)

(52) U.S. Cl.
CPC .......... *B29C 48/0018* (2019.02); *B29C 48/12* (2019.02); *B29C 48/913* (2019.02); *B29C 48/92* (2019.02); B29C 48/0019 (2019.02); B29C 48/08 (2019.02); B29C 48/10 (2019.02); B29C 48/885 (2019.02); B29C 48/911 (2019.02); B29C 48/914 (2019.02); B29C 48/917 (2019.02); B29C 2948/92704 (2019.02); B29C 2948/92923 (2019.02); B29L 2031/727 (2013.01)

(58) Field of Classification Search
CPC ..... B29C 48/0018; B29C 48/10; B29C 48/88; B29C 48/89; B29C 48/912; B29C 48/9125; B29C 48/918; B29C 48/9185; B29C 42/12; B29C 48/09–10; B29C 48/87; B29C 48/875; B29C 48/889; B29C 48/9115; B29C 48/0015; B29C 48/885
See application file for complete search history.

(56) References Cited

U.S. PATENT DOCUMENTS

| 3,095,665 A * | 7/1963 | Killen ............... A47B 97/08 248/449 |
| 3,320,340 A * | 5/1967 | Luca ................. B29C 48/10 264/566 |
| 3,340,116 A | 9/1967 | Naito |

(Continued)

OTHER PUBLICATIONS

"Polyethylene Film Processing Guide: Quality, Value and Performance", Formosa Plastics Corporation; Jun. 2014, 7 pages.

*Primary Examiner* — Matthew J Daniels
*Assistant Examiner* — Andrew L Swanson
(74) *Attorney, Agent, or Firm* — Stinson LLP

(57) ABSTRACT

A system and method for extruding film with a thickened profile section. In some embodiments, the film forms bags with integral zipper profiles. Plastic film is extruded to form a tube. During extrusion, each thickened profile section is radiantly cooled in a preferential manner before thinner sections of the film freeze. A freezing control device includes at least one radiant cooling plate that is operatively aligned with a thickened profile section. The device also includes a cooling fluid recirculation system configured to maintain the plate at a temperature below the temperature of the extruded tube. The plate can be adjustably mounted on a base for positioning the plate at the desired orientation for cooling the thickened profile section of the tube.

25 Claims, 5 Drawing Sheets

(51) Int. Cl.
  *B29C 48/885* (2019.01)
  *B29C 48/10* (2019.01)

(56) References Cited

U.S. PATENT DOCUMENTS

| | | | |
|---|---|---|---|
| 3,597,795 A | | 8/1971 | Naito |
| 3,852,386 A | * | 12/1974 | Behr ..................... B29D 5/10 |
| | | | 264/40.6 |
| 3,875,281 A | | 4/1975 | Behr |
| 4,003,972 A | | 1/1977 | Herz |
| 4,115,048 A | | 9/1978 | Alderfer et al. |
| 4,243,363 A | | 1/1981 | Mulcahy |
| 4,315,963 A | | 2/1982 | Havens |
| 4,443,400 A | | 4/1984 | Herrington |
| 5,676,893 A | | 10/1997 | Cree |
| 6,994,535 B2 | | 2/2006 | Pawloski |
| 7,695,263 B2 | | 4/2010 | Fischer |
| 2004/0047932 A1 | * | 3/2004 | Lupke .................... B29C 48/30 |
| | | | 425/72.1 |
| 2005/0006820 A1 | * | 1/2005 | Grajewski ............ B29C 48/914 |
| | | | 264/405 |
| 2009/0224440 A1 | * | 9/2009 | Backmann .......... B29C 48/9125 |
| | | | 264/563 |
| 2015/0375438 A1 | * | 12/2015 | Kosub .................. B29C 48/913 |
| | | | 264/555 |
| 2016/0257056 A1 | * | 9/2016 | Schumacher ........... B29C 49/04 |

\* cited by examiner

EXTRUSION SYSTEM AND METHOD FOR BLOWN FILM WITH INTEGRAL PROFILES

FIELD

The present invention generally relates to blown films having integral profiles such as for bags and packaging.

BACKGROUND

Plastic bags having zippers and used for storing food and other items present unique manufacturing challenges because they have so-called "integral profiles" which are sections of the bag films which are thicker than other sections of the bag films. Zipper bags are generally manufactured by either separately forming a bag body and zipper profile and appending the zipper profile to the bag body or forming the bag body and zipper profile together in one process. Extrusion is one method of forming a bag body and zipper profile in a single process. When a bag body and zipper profile are extruded together in the same process, the thicker sections that define the zipper profile cool more slowly in the sense that they take longer to cool than the thinner sections that define the bag body. The differential cooling times impart stresses and can result in distortion of the profile shapes. Also, slower cooling rates can permit relaxation of shape which manifests itself as distortion. In order to maintain dimensional integrity of the thicker profile, slower cooling segments, as a general proposition it is necessary to use slow forming speeds so that the thicker profile sections are sufficiently hardened before the films are collapsed to minimize damage and distortion.

SUMMARY

Briefly, therefore, the invention is directed to an improved process and apparatus for manufacturing blown films having integral profiles such as zippers in plastic bag films which process and apparatus manifest high speed, simplicity, reliability, and integrity of profile dimensions.

In one aspect, an extrusion system comprises an extruder configured to extrude a plastic material along an extrusion axis. An extrusion die defines an extrusion passage having a least one thin segment and at least one thick segment. The extrusion die is operatively connected to the extruder to receive the plastic material therefrom such that the extruded plastic material passes through the extrusion passage. The extrusion passage is configured to shape the plastic material into a film tube having a thickened profile section aligned with the thick segment of the extrusion passage. A freezing control device is positioned relative to the extrusion die to be received in an interior of the film tube as the film tube is being extruded. The freezing control device comprises a cooling plate configured to radiantly cool a circumferential segment of the film tube including the thickened profile section as the film tube is being extruded and thereby preferentially cool the thickened profile section.

In another aspect, a method for manufacturing a blown plastic film having integral profiles using an extruder comprises extruding a tube of polymer resin including at least one continuous thickened profile section and at least one continuous thin section extending along an axis of extrusion. Each thickened profile section is preferentially cooled by radiantly cooling at least one circumferential segment of the tube including the at least one thickened profile section. The extruded tube defines a bubble extending from an extrusion die head at an upstream end of the bubble to a film collector at a downstream end of the bubble.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
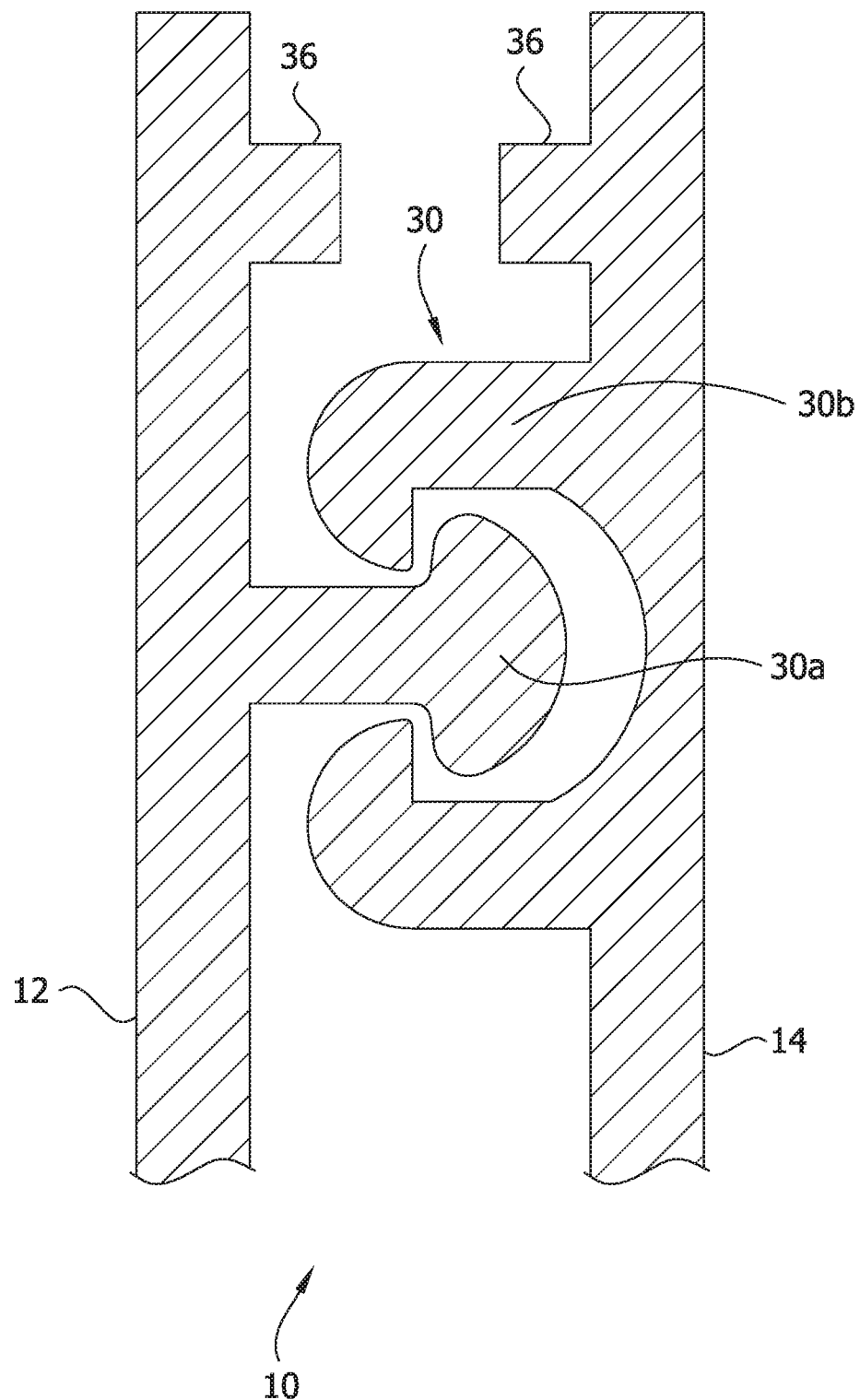
FIG. 1 is a fragmentary cross section of a zipper profile of a bag.

The present disclosure is directed to systems and methods for manufacturing a blown plastic film having integral profiles. Referring to FIG. 1, an example of such a film and associated product is a sealable plastic bag, generally indicated at reference number 10, such as for food storage, specimen storage, or other storage wherein the bag has a zipper. Other types of blown plastic film with thickened profile sections can also be manufactured with the systems and methods described below without departing from the scope of the invention. As will be appreciated, the systems and methods described herein enable the extrusion of a blown plastic film with one or more thickened profile sections at a relatively high extrusion speed and while maintaining the desired integrity of the shape of the thickened profile sections.

The bag 10, illustrated in FIG. 1, is an example of one blown plastic film structure having a plurality of thickened profile sections. The bag 10 includes two primary bag panels 12, 14 and a zipper 30 adapted to selectively close the bag 10. The interlocking components of the zipper 30 have a thicker profile than the film that constitutes the side walls 12, 14 of the bag 10. In the illustrated embodiment, the bag includes zipper components 30a, 30b and gripper ribs 36 which form thickened profile sections of the bag. It will be understood that other embodiments of a bag or other film will have thickened profile sections of other shapes without departing from the scope of the invention. As will be appreciated by one skilled in the art, the bag panels 12, 14 and thickened profile sections 30a, 30b, 36 can be extruded together such that the thickened profile sections extend continuously in the direction of extrusion along a surface of a tube, which is further processed to form the bag 10. The zipper components 30a and 30b and gripper ribs 36 in FIG. 1 are examples of such thickened profile sections, wherein the thickened profile sections are co-extruded with a tube that eventually forms panels 12, 14.

Figure 2:
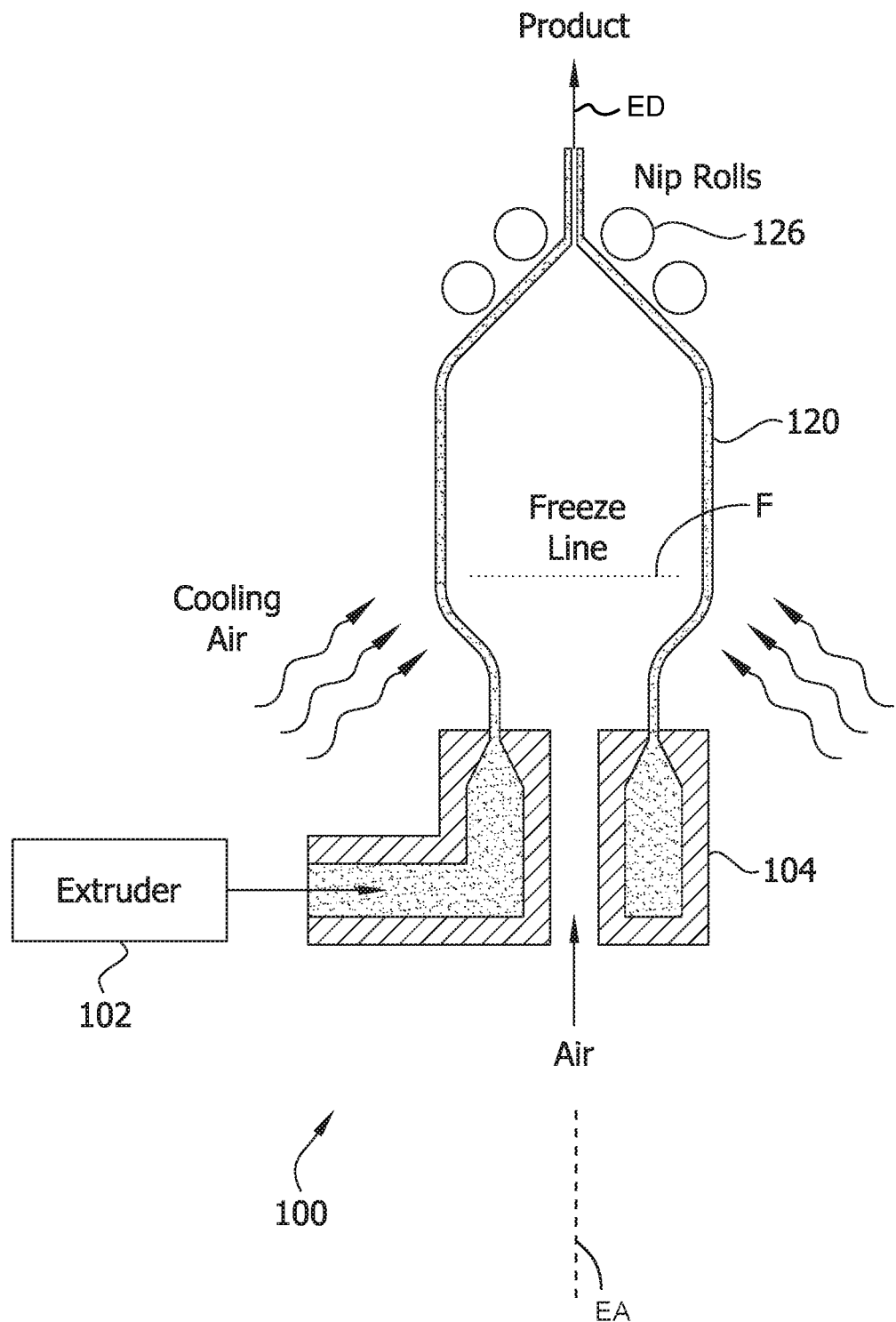
FIG. 2 is a schematic diagram of an extrusion system.
Figure 3:
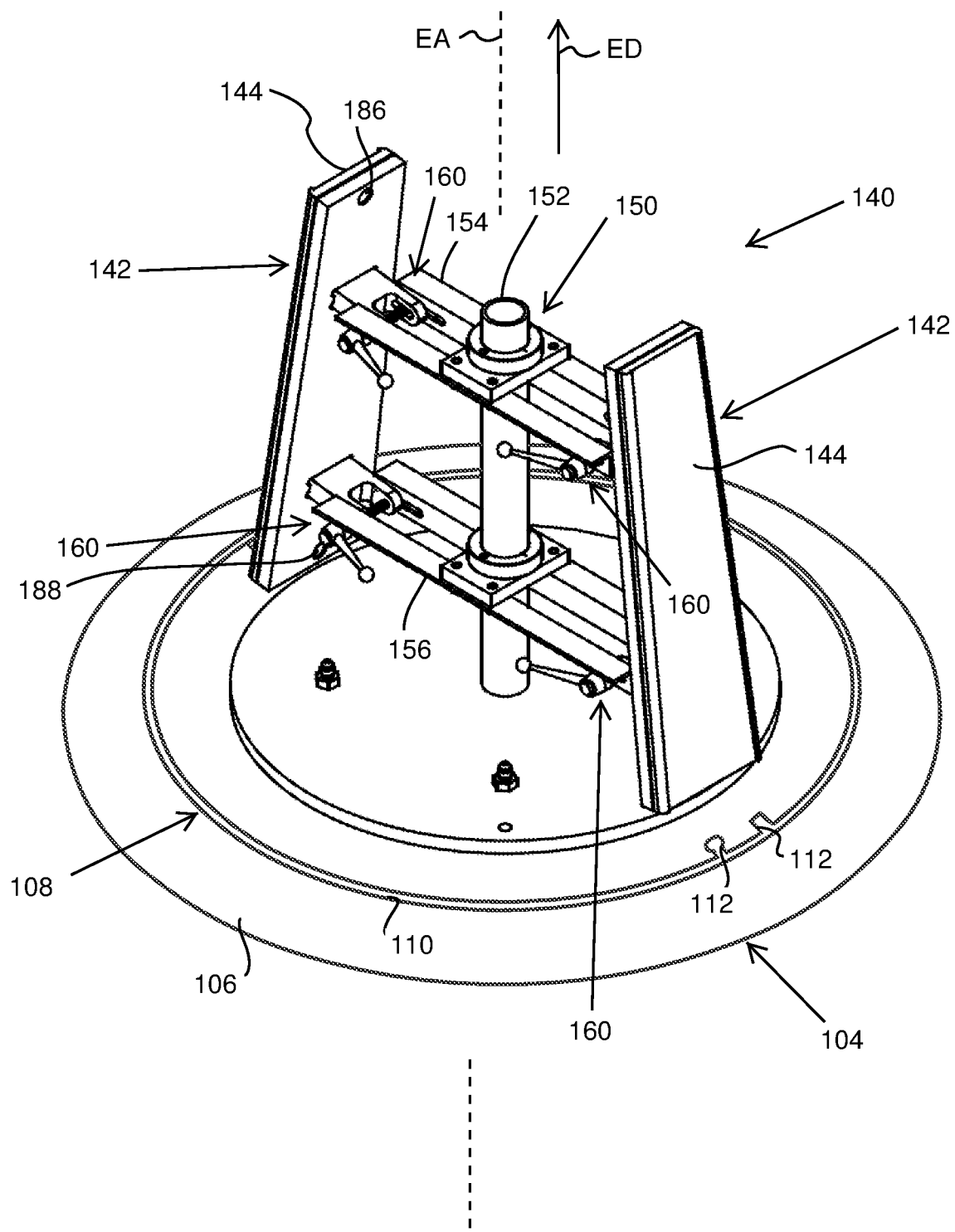
FIG. 3 is a perspective of a freezing control device for use with the extrusion system.

As a general proposition, the invention is performed using an extrusion system 100 as shown schematically in FIG. 2 which has an extruder 102 in which polymer is melted and pumped into a tubular die 104 through which it is extruded. In general the die 104 defines a die passage 108 (FIG. 3), which defines the cross-sectional shape of the film as it exits the die. As shown in FIG. 3, in some embodiments, the die 104 includes a die head 106, which defines the die passage 108. In general, a die 104 and die head 106 define a die passage 108 extending along an extrusion axis EA. The extrusion passage 108 defines one or more thin segments 110 and one or more thick segments 112. In the embodiment illustrated in FIG. 3, the thin segments 110 are bag panel segments, which define the panels 12, 14 of a bag 10; the thick segments 112 are zipper segments and gripper rib segments, which define the zipper components 30a, 30b and gripper ribs 36, respectively.

Referring again to FIG. 2, the extruder 102 pumps molten plastic materials through the die 104 to form an extruded tube or bubble 120 of plastic film. Air is blown along the extrusion axis EA in an extrusion direction ED through the middle of the extruded tube. Typically, the tube 120 is expanded in both the lengthwise and radial direction up until a so-called "frost line" or "freeze line" F at which point the plastic film solidifies such that it no longer expands. But in other embodiments, the tube 120 does not expand radially after exiting the extrusion die 104. For example, in some embodiments, the tube 120 narrows radially between the die 104 and frost line F. The height of the frost line F is measured as the distance from the die head 106 to the frost line. The change in radial dimension of the film tube 120 between the outlet of the die 104 and the frost line F is measured as a blow up ratio (BUR). The BUR is the ratio of the diameter of the tube 120 at the frost line F to the diameter of the die passage 108, and it manifests the amount of stretching the polymer is undergoing during the shaping of the film. In particular, the BUR is calculated as follows: BUR=(0.637×Lay-Flat Width)/die diameter. In this calculation, the "lay-flat width" is the width of the film when collapsed into its flat bag conformation. If an extrusion system 100 has a BUR that is greater than one, the tube 120 expands radially as it extends from the die 104 to the frost line F. If the extrusion system 100 has a BUR that is less than one, the tube 120 shrinks radially as it extends from the die 104 to the frost line F. In certain conventional blown film applications, it is desirable to use an especially low diameter die relative to the width of the ultimate bag so that there is significant expansion and stretching in the lateral direction during blowing of the film. But as discussed in further detail below, in certain embodiments, the film 120 is extruded at a much lower BUR than in those conventional applications.

There is a collector 126 above the frost line F for collecting the edges of the tube 120, which collector is here depicted as nip rolls. The tube 120 travels in the extrusion direction from the frost line F to the collector 126, which arranges the tubular film for subsequent processing. The illustrated collector 126 collapses the tube 120 such that the tube defines a bubble extending from the extrusion die head 106 at an upstream end of the bubble to the film collector 126 at a downstream of the bubble.

In accordance with one embodiment, the die system 100 forms a film having one or more thickened profile sections (e.g., the bag 10, with thickened profile sections 30a, 30b, 36). Each thickened profile section is extruded through the thick sections 112 of the die passage 108. During extrusion, each thickened profile section is preferentially cooled by radiantly cooling a circumferential segment of the film tube 120 including the thickened profile section. Referring to FIG. 3, in an exemplary embodiment, the die system 100 includes a freezing control device, generally indicated at 140. The illustrated freezing control device 140 is positioned relative to the extrusion die 104 to be received in the interior of the film tube 120 as the film tube is being extruded. As the film tube 120 is being extruded, the freezing control device 140 is configured to radiantly cool spaced apart circumferential segments of the film tube at generally diametrically opposite positions on the tube. Since the freezing control device targets one or more specific segments of the film to impact cooling as the film is being extruded, while the rest of the film is not targeted, the freezing control device facilitates extrusion with differential bulk cooling rates between—i.e., differential rates of heat absorption from— the segments being targeted in comparison to the rest of the film. Other freezing control devices can be configured to radiantly cool one or more circumferential segments of an extruded film tube at other positions of the tube without departing from the scope of the invention.

The freezing control device 140 comprises first and second cooling plates, each generally indicated at 142. As explained below, each of the cooling plates 142 is configured to receive recirculated cooling fluid that cools the plate to maintain a radially outwardly facing cooling surface 144 of the plate at a lower temperature than the extruded film tube 120. In one or more embodiments, the freezing control device 140 is configured to maintain the cooling surface 144 of each cooling plate 142 at a cooling temperature that is at least about 220° F. lower than an extrusion temperature at which the film tube 120 is extruded through the die head 106 (e.g., each cooling surface is maintained at a temperature of less than or equal to about 60° F.). In the illustrated embodiment, each cooling surface 144 is substantially planar, but in other embodiments, cooling surfaces could have other shapes (e.g., curved to correspond with the curvature of the respective circumferential segment of the extruded film tube) without departing from the scope of the invention. Each cooling surface 144 is circumferentially aligned with a respective circumferential segment of the film tube 120 that includes one or more thickened profile sections. The low temperature cooling surface 144 thus radiantly absorbs heat from the respective circumferential segment of the tube 120 to preferentially cool the thickened profile sections and hasten freezing of the thickened profile sections so that the thickened profile sections freeze in about the same amount of time as the thin profile sections. In contrast to cooling surfaces that have fluid ports for blowing a gas onto a substrate to be cooled, the cooling surfaces of the invention are continuous surfaces in the sense that they are completely uninterrupted by any ports for ejection of cooling fluid. The cooling fluid, which is preferably a liquid cooling fluid in currently preferred embodiments, is retained within the cooling plates and their associated plumbing, and does not directly contact the surface being cooled. Rather, the cooling fluid cools the cooling plates, which in turn extract heat from the substrate profile being cooled by radiant and atmospheric heat transfer.

Figure 4:
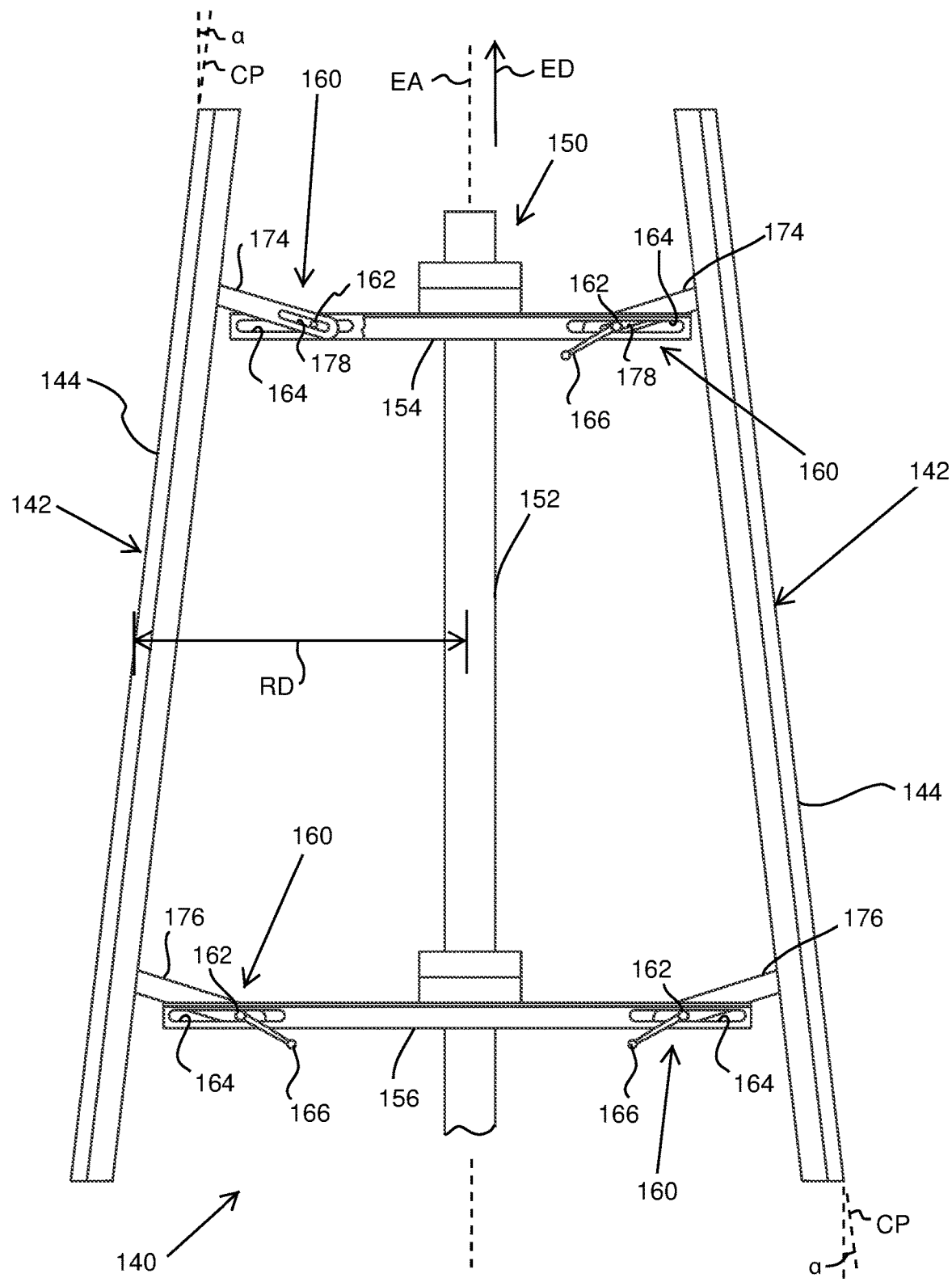
FIG. 4 is a fragmentary elevation of the freezing control device.

In one or more embodiments, the cooling surface 144 of each cooling plate 142 is oriented transverse to the extrusion axis EA. For example, referring to FIG. 4, the cooling plate 142 is mounted in the extrusion system 100 such that the planar cooling surface 144 extends in a cooling plane CP oriented at a cooling surface angle α with respect to the extrusion axis EA in an inclusive range of from about 0° to about 45°. In certain embodiments, the extrusion system 100 is configured to extrude the film tube 120 so that the portion of the film tube located below the frost line F is oriented substantially parallel to the cooling surface 144. For example, the cooling surface and the portion of the film tube 120 located below the frost line F can define a gap having a substantially uniform thickness along the length of the cooling plate 142. In the illustrated embodiment, the cooling surface 144 angles inward toward the extrusion axis EA as it extends in the extrusion direction ED. Thus, the illustrated cooling surfaces 144 can be oriented parallel to the portion of the film tube 120 located below the frost line F when the film tube is extruded at a BUR of less than 1. In other embodiments, the cooling plates can be oriented to extend substantially parallel to the extrusion axis (e.g., when the extrusion system is configured to extrude the film tube at a BUR of about 1) or to angle outwardly as they extend in the extrusion direction (e.g., when the extrusion system is configured to extrude the film tube at a BUR of greater than 1) and/or the cooling surfaces can be non-parallel with portions of the extruded film tube located below the frost line.

In the illustrated embodiment, the cooling plates 142 are adjustably mounted on a base, generally indicated at 150. The base 150 includes a mounting pole 152 extending generally along the extrusion axis EA and downstream and upstream mounting brackets 154, 156 secured to the mounting pole at spaced apart locations along the extrusion axis EA. Because the illustrated freezing control device 140 is configured so that the cooling plates 142 angle inward as they extend along the extrusion axis EA in the extrusion direction ED, the downstream mounting bracket 154 is shorter than the upstream mounting bracket 156. Each mounting bracket 154, 156 extends radially of the extrusion axis EA in opposite directions. In one or more embodiments, the mounting brackets 154, 156 are mounted on the mounting pole 152 for being selectively rotated about the extrusion axis EA to position the cooling plates 142 at the desired circumferential positions with respect to the extrusion axis. In the illustrated embodiment, the mounting brackets 154, 156 mount both of the cooling plates 142 to the mounting pole 152, but in other embodiments, the cooling plates could be mounted on the pole using separate brackets. Each of the illustrated mounting bracket 154, 156 comprises two L-shaped bracket members that extend parallel to one another and are spaced apart from one another on diametrically opposite sides of the mounting pole 152. Other mounting brackets could have other configurations in other embodiments.

The illustrated freezing control device 140 includes an adjustment mechanism, generally indicated at 160, which secures each cooling plate 142 to the base 150 at a respective end portion of each mounting bracket 154, 156. As explained below, the adjustment mechanisms 160 are configured to guide selective movement of the cooling plates 142 with respect to the base 150 through a range of motion and to selectively lock the plate in position with respect to the base at any desired position in the range of motion. In the illustrated embodiment, each adjustment mechanism 160 includes a clamping screw 162 extending through a respective elongate slot 164 formed in the respective end portion of the respective mounting bracket 154, 156 and a lever arm 166 for selectively tightening the clamping screw against the respective mounting bracket. In the illustrated embodiment, each slot 164 extends through each of the L-shaped bracket members of the mounting bracket 154, 156, and the ends of the clamping screws 162 opposite the lever arms 166 are threadably received in a nut (not shown) outboard of the respective L-shaped bracket member.

A downstream plate mount 174 extends proximally from adjacent the downstream end portion of each cooling plate 142 and receives the clamping screw 162 extending through the respective downstream mounting bracket slot 164. Likewise, an upstream plate mount 176 extends proximally from an upstream end portion of each cooling plate 142 and receives the clamping screw 162 extending through the respective upstream mounting bracket slot 164. For example, the illustrated plate mounts 174, 176 receive the mounting screws 162 at respective locations between the parallel L-shaped mounting bracket members forming the upstream and downstream mounting brackets 154, 156. In the illustrated embodiment, the upstream plate mount 176 defines a hole that closely receives the respective clamping screw 162 and the downstream plate mount 174 defines an elongate slot 178 for receiving the respective clamping screw. When the clamping screws 162 are loosened, the upstream plate mount 176 can pivot about the respective mounting screw 162 and the corresponding downstream clamping screw can slide through the slot 178 such that the cooling plate 142 pivots about the upstream clamping screw to adjust the cooling surface angle α. For example, in one embodiment the adjustment mechanisms 160 are configured to guide pivoting movement of the cooling plates 142 about the upstream clamping screws 162 such that the range of motion of each cooling plate extends from at least a first position in which the cooling plane CP is oriented at a cooling surface angle α of about 45° to a second position in which the cooling plane is oriented at an angle of about 315°. In addition, the screws 162 can slide along the mounting bracket slots 164 to adjust a radial distance RD between the extrusion axis EA and a midpoint of the cooling plate 142 along its length. For example, in one or more embodiments, the adjustment mechanisms 160 are configured to guide sliding movement of the cooling plates 142 such that the radial distance RD can be increased by at least about 3 inches by sliding the clamping screws 162 from a first position in which the clamping screws are received in the inner end portions of the mounting bracket slots 164 to a second position in which the clamping screws are received in the outer end portions of the mounting bracket slots. To lock each cooling plate 142 in the desired positions it its range of motion, the clamping screws 162 are tightened using the lever arms 166 to fix the plate mounts 174, 176 in position with respect to the mounting brackets 154, 156.

Figure 5:
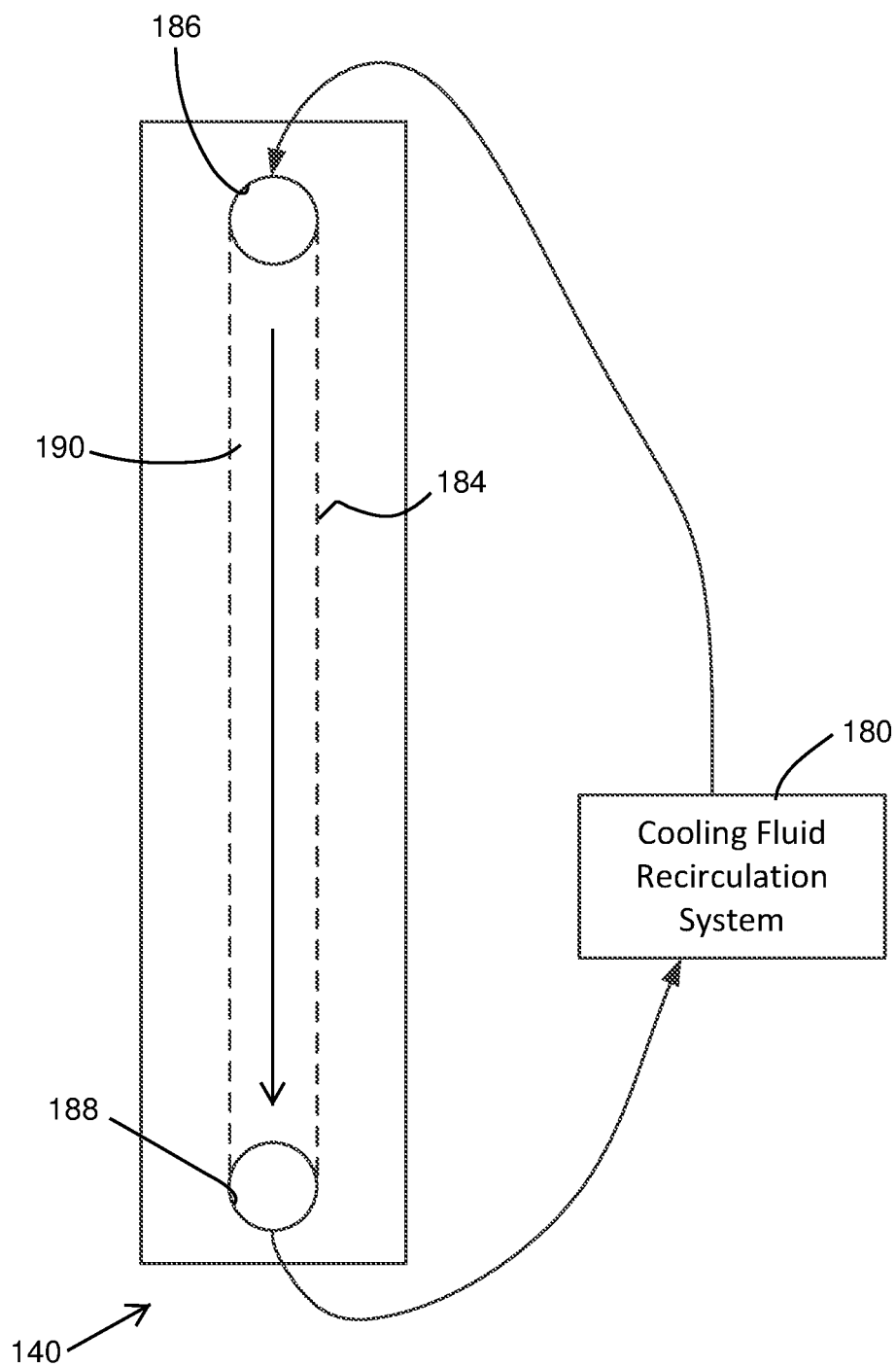
FIG. 5 is a schematic illustration of a cooling fluid recirculation system of the freezing control device.

Referring to FIG. 5, the freezing control device 140 comprises a cooling fluid recirculation system, generally indicated at 180, which is configured to recirculate cooling fluid through each cooling plate 142 (only one of the cooling plates is shown in FIG. 5 for clarity) while the extruder 102 extrudes the film tube 120. In the currently preferred embodiment, each plate 142 is designed for leak-proof retention of a cooling fluid which is liquid, in contrast to retention of a gaseous cooling fluid. In one embodiment, the cooling fluid recirculation system 180 includes a chiller for chilling the recirculated cooling fluid and a pump for pumping the recirculated cooling fluid through each of the cooling plates 142 (the chiller and pump are not shown separately in FIG. 5). In one or more embodiments, water is used as the cooling fluid, but other cooling fluids (e.g., refrigerants, etc.) can be used in other embodiments. Each cooling plate 142 includes recirculation plumbing 184 including a cooling fluid inlet 186, a cooling fluid outlet 188, and a cooling fluid flow channel 190 inside the plate fluidly communicating between the cooling fluid inlet to the cooling fluid outlet. Other than the inlet that brings cooling fluid into the cooling plate and the outlet through which warmed fluid flows directly into a conduit for directing the warmed fluid back to the chiller, there are no fluid ports in the cooling plate. In the illustrated embodiment, the cooling fluid flow channel 190 is configured to direct the cooling fluid along a flow extending generally along the height of the cooling plate 142 from the inlet 186 adjacent the top end of the plate to the outlet 188 adjacent the bottom end of the plate. But other embodiments can direct the cooling fluid along other flow paths without departing from the scope of the invention. The cooling fluid recirculation system 180 is configured to inject the cooling fluid into the recirculation plumbing 184 through the inlet 186 at a first temperature (e.g., a first temperature in an inclusive range of from about 40° F. to about 70° F., such as an inclusive range of from about 62° F. to about 57° F.), and the cooling fluid is configured to cool the cooling plate 184 as it flows through the cooling fluid flow channel 190. The cooling fluid recirculation plumbing 184 is thermally coupled to the cooling surface 144 of the cooling plate 142 such that the cooling fluid flowing through the fluid flow channel 190 absorbs at least some of the heat that is radiantly absorbed by the cooling plate. Thus, the cooling fluid is discharged from the cooling fluid outlet 188 at a second temperature that is higher than the first temperature (e.g., the second temperature is at least about 5° F. higher than the first temperature; for example, the second temperature is in an inclusive range of from about 70° F. to about 85° F., such as an inclusive range of from about 72° F. to about 77° F.).

As can be seen therefore, the illustrated freezing control device 140 is configured to preferentially cool thickened profile sections of an extruded film tube 120 by radiantly cooling circumferential segments of the tube that include the thickened profile sections below the frost line F. More specifically, the cooling surfaces 144 of the cooling plates 142 face the circumferential segments of the tube 120 to radiantly absorb heat from the segments to hasten the freezing of the thickened profile sections so that they freeze in about the same amount of time as the thin profile sections. That is, this arrangement allows the operator to increase the cooling rate of thicker sections, so that the thicker sections freeze in less time than without this arrangement. While the thicker sections still typically take longer to freeze than the thinner sections even with enhanced cooling rate of the thicker sections, the thicker sections nonetheless freeze in a short enough time period to achieve high throughput without suffering severe distortion problems. In particular, even at high throughput speeds, the thicker sections are sufficiently hardened when the bag is collapsed in the collector that the collapsing and collecting operation does not cause significant distortion. Generally speaking, cooling of the thicker sections is a limiting factor on throughput line speed, and increasing line speed increases risk of distortion of the profiles. By increasing the cooling rate of the thicker sections, the line speed can be increased while decreasing the risk of profiles distorting.

The cooling fluid recirculation system 180 and the recirculation plumbing 184 maintain the cooling plates 142 at the desired temperature for radiantly cooling the thickened profile sections of the tube 120, and the adjustment mechanisms 160 allow a user to adjust an orientation of the cooling plates to the desired position (e.g., so that the cooling planes CP are oriented substantially parallel to the respective thickened profile section below the frost line F and/or at the desired gap thickness between the tube and the cooling surface 144). In one embodiment, the thickened profile sections are preferentially cooled by the radiant cooling provided by the cooling plates 142 and without supplemental preferential cooling provided by, for example, convection or air impingement. That is, the preferential cooling mechanism strictly consists of radiant cooling and there is no preferential conduction or convection cooling. Although preferentially cooling the thickened profile sections of an extruded film tube 120 using only the cooling plates 142 is believed to be effective, it is understood that the radiant cooling could be supplemented with additional cooling devices, such as the convective cooling devices described in U.S. Patent Application Publication No. 2015/0375438 (U.S. patent application Ser. No. 14/788,274), entitled BLOWN FILM WITH INTEGRAL PROFILES and assigned to the assignee of this invention, which is hereby incorporated by reference in its entirety.

One effect of this freezing control device 140 is that it cools the thickened profile sections of the film but only has limited effect on the thinner portions of the film that may lower the frost line F. The radiant cooling is focused on the thickened profile sections but has restricted effect on the overall film so the height of frost line F can be raised. In one embodiment, for example, the frost line is at least about 13 inches above the extrusion die head 106, such as from about 13 to about 20 inches above the die head. With this higher frost line, a greater production speed is possible such as at least about 100 feet/minute, such as at least about 110 feet per minute, or at least about 120 feet per minute (e.g., from about 120 to about 135 feet per minute). Thus, in certain embodiments, the film tube 120 narrows as it extends from the die head 106 toward the frost line F (e.g., the tube has a BUR of less than one).

The material used to manufacture the films of the invention is, in one or more preferred embodiments, conventional polyethylene-based material selected from among low density polyethylene (LDPE), linear low density polyethylene (LLDPE), metallocene linear low density polyethylene (m-LLDPE), and blends thereof. For example, one embodiment uses a blend of about 70-75 wt % LDPE, about 15-25 wt % LLDPE, and about 5-10 wt % m-LLDPE. The compositions of the layers are described herein as containing various components by weight %. However, those skilled in the art understand that in a layer of the ultimate film, the specific compounds may not be separately identifiable or even necessarily separately present. Nonetheless, it is conventional in the art to refer to the final composition as containing a given % of the individual components that go into forming the film; so that is done here. From this perspective, the compositions herein are on an equivalent basis.

In general, systems and methods of film extrusion according to the present invention form film tubes 120 having relatively low BUR. In one embodiment of the invention the process employs a BUR in the range of about 2 to 3, which corresponds to modest stretching. This is a lower BUR than one would typically use with HMW-HDPE blown films. In an alternative embodiment of the invention, parameters are used which manifest a BUR of less than 2, such as less than or equal to 1. Applicants have discovered that using a lower BUR such as this enhances dimensional stability of the thicker profile sections because the overall film is not stretched as much laterally after exiting the die as compared to higher BUR processes.

A natural consequence of this lower BUR, however, is a detrimental effect on impact strength as the lower BUR film is primarily oriented in the machine direction (MD) and less oriented in the transverse direction (TD) in comparison to higher BUR films. But this natural consequence is addressed and avoided in the present invention by intentionally raising the frost line F by reducing the external cooling. Reducing the external cooling can be achieved by, for example, using less cool air or a lower flow rate. A reduction in external cooling raises the frost line F so the film has more time to cool so that the MD and TD orientation in the cooled film is more balanced. That is, a blown film with X seconds to cool will have greater MD orientation and less MD/TD orientation balance than a blown film with X+Y seconds to cool. Stated another way, a blown film using a die-to-frost line height of e.g. 10 inches will have greater MD orientation and less MD/TD orientation balance than a blown film with a die-to-frost line height of 15 inches. Because the bulk film here with the raised frost line F has more time to cool, the bulk film has a good balance of MD and TD orientation. So a higher BUR is not required to impart adequate impact strength. And a lower BUR can be used to enhance dimensional stability of thicker profile sections.

While the higher frost line F has a positive effect on MD/TD orientation balance, it has a potentially negative effect on dimensional stability of thicker profile sections. In particular, these profile sections would have more time in their molten condition before solidifying, which risks relaxation and distortion. However, this risk is eliminated or at least minimized in the present invention by the preferential cooling operation described above, which rapidly freezes the thicker profile features such as zippers and freezes them independently from the film so the thicker profile sections do not lose the shape imparted by the die or deform in bubble collapsing.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. An extrusion system comprising:
    an extruder configured to extrude a plastic material along an extrusion axis;
    an extrusion die defining an extrusion passage having a least one thin segment and at least one thick segment, the extrusion die being operatively connected to the extruder to receive the plastic material therefrom such that the extruded plastic material passes through the extrusion passage, the extrusion passage being configured to shape the plastic material into a film tube having a thickened profile section aligned with the thick segment of the extrusion passage; and
    a freezing control device positioned relative to the extrusion die to be received in an interior of the film tube as the film tube is being extruded, the freezing control device comprising a cooling plate configured to radiantly cool a circumferential segment of the film tube including the thickened profile section as the film tube is being extruded and thereby preferentially cool the thickened profile section;
    wherein the cooling plate has a cooling surface that is parallel to an extrusion axis or angles inward toward the extrusion axis as it extends in the extrusion direction wherein the freezing control device comprises a base wherein the freezing control device includes an upper adjustment mechanism and a lower adjustment mechanism adjustably mounting the cooling plate on the base.

2. The extrusion system of claim 1 wherein the cooling surface faces radially outward toward the film tube.

3. The extrusion system of claim 1 wherein the extruder is configured to extrude the film tube so that said circumferential segment of the film tube is substantially parallel to the cooling surface as it is extruded past the cooling surface.

4. The extrusion system of claim 1 wherein the cooling surface is substantially planar.

5. The extrusion system of claim 1 wherein the upper and lower adjustment mechanisms are configured configured to guide selective movement of the plate with respect to the base through a range of motion and to selectively lock the plate at any position in the range of motion.

6. The extrusion system of claim 1 wherein the plate extends generally in a cooling plane and the range of motion extends from at least a first position in which the cooling plane is oriented at an angle of about 45° with respect to the extrusion axis to a second position in which the cooling plane is oriented at an angle of about 315° with respect to the extrusion axis.

7. The extrusion system of claim 1 wherein the cooling plate is configured to be cooled to a cooling plate temperature and the extruder is configured to extrude the film tube at an extrusion temperature, the cooling temperature being at least about 220° F. lower than the extrusion temperature.

8. The extrusion system of claim 1 further comprising a cooling fluid recirculation system configured to recirculate cooling fluid through the cooling plate while the extruder extrudes the film tube.

9. The extrusion system of claim 8 wherein the cooling fluid recirculation system is configured to inject the cooling fluid into the cooling plate at a temperature in an inclusive range of from about 40° F. to about 70° F.

10. The extrusion system of claim 8 wherein the cooling plate includes recirculation plumbing extending through the cooling plate including a cooling fluid inlet, a cooling fluid outlet, and a cooling fluid flow channel, the cooling fluid recirculation system being configured to inject the cooling fluid into the recirculation plumbing through the inlet at a first temperature and the cooling fluid being configured to absorb heat from the circumferential segment of the film tube such that the cooling fluid is discharged through the outlet after flowing through the flow channel at a second temperature that is at least about 5° F. higher than the first temperature.

11. The extrusion system of claim 1 wherein the freezing control device comprises two cooling plates extending upwardly from the die, each of which has a planar cooling surface facing outwardly from an extrusion die central cooling axis;
    each cooling surface is circumferentially aligned with a circumferential segment of the film tube which includes a thickened zipper profile segment; and
    the cooling plates are positioned directly across the extrusion die from each other.

12. A method for manufacturing a blown plastic film having integral profiles using an extruder, the method comprising:
    extruding a tube of polymer resin including at least one continuous thickened profile section and at least one continuous thin section extending along an axis of extrusion; and
    preferentially cooling each thickened profile section by radiantly cooling at least one circumferential segment of the tube including the at least one thickened profile section using a cooling plate having a planar cooling surface outwardly facing toward the at least one thickened profile section;

wherein the cooling plate has a cooling surface that is parallel to an extrusion axis or angles inward toward the extrusion axis as it extends in the extrusion direction;

wherein the extruded tube defines a bubble extending from an extrusion die head at an upstream end of the bubble to a film collector at a downstream end of the bubble wherein the freezing control device comprises a base wherein the freezing control device includes an upper adjustment mechanism and a lower adjustment mechanism adjustably mounting the cooling plate on the base.

13. The method of claim 12 wherein the step of preferentially cooling comprises radiantly absorbing heat from the at least one circumferential segment of the tube using said cooling plate having a cooling surface facing the at least one circumferential segment of the tube.

14. The method of claim 13 further comprising adjusting an orientation of the cooling plate so that the cooling surface is oriented substantially parallel to the at least one circumferential segment of the tube.

15. The method of claim 13 wherein the step of extruding the tube comprises extruding the tube such that the at least one thickened profile section is oriented substantially parallel to the cooling surface as the at least one thickened profile section is extruded along the extrusion axis past the cooling plate.

16. The method of claim 12 wherein the step of preferentially cooling comprises radiantly cooling the at least one circumferential segment of the tube below a frost line of the tube.

17. The method of claim 12 wherein the step of preferentially cooling each thickened section comprises radiantly cooling at least two circumferentially spaced apart segments of the tube, each of the at least two segments of the tube including at least one of the at least one thickened profile sections.

18. The extrusion system of claim 1 wherein the cooling surface angles inward toward the extrusion axis as it extends in the extrusion direction.

19. The extrusion system of claim 1 wherein the cooling surface angles inward toward the extrusion axis as it extends in the extrusion direction and is parallel to at least one circumferential segment of a film tube being extruded.

20. The extrusion system of claim 1 wherein the cooling surface is parallel to the extrusion axis.

21. The extrusion system of claim 1 wherein:
the freezing control device comprises exactly two of said cooling plates each having a cooling surface and configured to radiantly cool circumferential segments of the film tube as the film tube is being extruded;
wherein each cooling surface angles inward toward the extrusion axis as it extends in the extrusion direction.

22. The extrusion system of claim 1 wherein:
the freezing control device comprises exactly two of said cooling plates each having a cooling surface and configured to radiantly cool circumferential segments of the film tube as the film tube is being extruded;
wherein each cooling surface angles inward toward the extrusion axis as it extends in the extrusion direction and is parallel to at least one circumferential segment of a film tube being extruded.

23. The extrusion system of claim 1 wherein:
the freezing control device comprises exactly two of said cooling plates each having a cooling surface and configured to radiantly cool circumferential segments of the film tube as the film tube is being extruded;
wherein each cooling surface is parallel to the extrusion axis.

24. The extrusion system of claim 1, wherein the freezing control device comprises multiple cooling plates that intersect a common plane extending radially with respect to the extrusion axis, the freezing control device being devoid of any cooling plates spaced apart from the common plane along the extrusion axis.

25. The extrusion system of claim 24 wherein there are exactly two of said cooling plates.

* * * * *